US007623948B2

(12) United States Patent
Gumpinger et al.

(10) Patent No.: US 7,623,948 B2
(45) Date of Patent: Nov. 24, 2009

(54) METHOD AND SYSTEM OF COMMUNICATION BETWEEN A MOTOR VEHICLE AND A DIAGNOSTIC UNIT

(75) Inventors: Franz Gumpinger, Munich (DE); Marc Torlo, Kirchheim bei Muenchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 42 days.

(21) Appl. No.: 11/955,947

(22) Filed: Dec. 13, 2007

(65) Prior Publication Data

US 2008/0167773 A1 Jul. 10, 2008

Related U.S. Application Data

(63) Continuation of application No. PCT/EP2005/006341, filed on Jun. 14, 2005.

(51) Int. Cl.
*G01M 15/02* (2006.01)

(52) U.S. Cl. ............................ 701/32; 701/29; 701/33; 701/35; 340/5.2; 340/5.6; 713/182; 713/185

(58) Field of Classification Search .................. 701/29, 701/32, 35; 702/182, 183, 184, 187, 188; 380/259, 260; 340/5.6, 5.61, 5.64; 713/185
See application file for complete search history.

(56) References Cited

U.S. PATENT DOCUMENTS

| | | | | |
|---|---|---|---|---|
| 5,838,251 | A | 11/1998 | Brinkmeyer et al. | |
| 6,169,943 | B1 * | 1/2001 | Simon et al. | 701/29 |
| 6,748,536 | B1 * | 6/2004 | Madau | 713/193 |
| 2004/0230348 | A1 * | 11/2004 | Mann et al. | 701/1 |

FOREIGN PATENT DOCUMENTS

| | | | |
|---|---|---|---|
| DE | 43 34 859 | A1 | 12/1994 |
| DE | 195 32 067 | C1 | 10/1996 |
| EP | 0 778 549 | B1 | 6/1997 |
| EP | 778549 | A2 * | 6/1997 |
| EP | 0 846 822 | B1 | 6/1998 |
| EP | 0 895 198 | B1 | 2/1999 |
| EP | 1 116 840 | A2 | 7/2001 |

OTHER PUBLICATIONS

Franz, Gumpinger et al, English translation of EP0846822, Individual data storage memory for positioning equipment parts of a vehicle, Jun. 10, 1998, European Patent Office.*

Helmut, Hillebrand, English translation of EP0778549, Vehicle with key and with on demand diagnostic data of equipment parts, Jun. 11, 1997, European Patent Office.*

International Search Report dated Mar. 3, 2006 with English translation (Six (6) Pages).

* cited by examiner

*Primary Examiner*—Khoi Tran
*Assistant Examiner*—Spencer Patton
(74) *Attorney, Agent, or Firm*—Crowell & Moring LLP

(57) ABSTRACT

In the case of a method of communicating between a motor vehicle and a diagnostic unit, a wireless communication connection is established between the motor vehicle and the diagnostic unit after an authorization of the diagnostic unit has been checked. The diagnostic unit is connected with a vehicle key assigned to the motor vehicle, and the authorization of the diagnostic unit is checked by use of authorization data stored in the vehicle key. A diagnostic unit for implementing such a method has devices for connecting with a vehicle key assigned to the motor vehicle. The diagnostic unit is suitable for receiving authorization data from the vehicle key, for the indirect or direct wireless communication with the motor vehicle, and for proving its authorization with respect to the motor vehicle by way of the received authorization data.

3 Claims, 1 Drawing Sheet

METHOD AND SYSTEM OF COMMUNICATION BETWEEN A MOTOR VEHICLE AND A DIAGNOSTIC UNIT

CROSS-REFERENCE TO RELATED APPLICATIONS

This application is a continuation of PCT International Application No. PCT/EP2005/006341, filed on Jun. 14, 2005, the entire disclosure of which are expressly incorporated by reference herein.

BACKGROUND AND SUMMARY OF THE INVENTION

The present invention relates to a method of communicating between a motor vehicle and a diagnostic unit, whereby a wireless communication connection is established between the motor vehicle and the diagnostic unit after an authorization of the diagnostic unit has been checked. Furthermore, the present invention relates to a diagnostic unit for implementing such a method.

According to the state of the art, normally a wired interface is used for communicating between a motor vehicle and a diagnostic unit for diagnostic and/or programming purposes or for accessing customer, adaptation, and/or vehicle data. In such a case, the diagnostic, programming and data communications with the vehicle can take place only after a manual connection. Particularly in the service environment of the data exchange, this can therefore only be accomplished at selected process points.

As an alternative to wired interfaces, wireless interfaces are known for communicating between a motor vehicle and a diagnostic unit. However, depending upon the type of wireless communication, these have various disadvantages.

For example, at present, telecommunication access on a cellular basis, as a rule, is not available in the case of every motor vehicle and, in addition, causes further expenses as a result of service provider fees. Also, today's telephone interfaces are not uniform worldwide. In order to take into account all variants and local differences, considerable technical and financial expenditures would be required.

In addition, known wireless interfaces for communicating between a motor vehicle and a diagnostic unit often do not provide any manner of checking the authorization of the diagnostic unit. If a checking of an authorization of the diagnostic unit is provided, disadvantageously, additional equipment-related expenditures, program-related expenditures, and/or communication expenditures are required.

The invention provides a simple method of communicating between a motor vehicle and a diagnostic unit, whereby a wireless communication connection is established between the motor vehicle and the diagnostic unit, after an authorization of the diagnostic unit has been checked. The invention further provides for a diagnostic unit which is suitable for implementing such a method.

According to the invention, a method is provided whereby the diagnostic unit is connected with a vehicle key assigned to the motor vehicle, and the authorization of the diagnostic unit is checked by use of authorization data stored in the vehicle key.

Further according to the invention, a diagnostic system is provided which has devices for connecting with a vehicle key assigned to the motor vehicle. A diagnostic unit is suitable for receiving authorization data from the vehicle key, for indirect or direct wireless communication with the motor vehicle, and for proving an authorization with respect to the motor vehicle by way of the received authorization data.

In modern motor vehicles, electronic locking systems are increasingly used, which permit the opening and locking of a vehicle also by way of a wireless communication. For securing the communication between the vehicle key and the vehicle, as a rule, a bidirectional data exchange is carried out. For this purpose, authorization data are stored in the vehicle key for checking its authorization, for example, in order to unlock the vehicle. The invention utilizes this principle for checking an authorization to solve another task, specifically the present task.

The method according to the invention requires only minimal equipment-related and program-related expenditures, yet nevertheless permits an effective authorization check of the diagnostic unit for communicating with the motor vehicle.

According to a first preferred variant of the present invention, the diagnostic unit has its own devices for direct wireless communication with the motor vehicle, and only authorization data are transmitted from the vehicle key to the diagnostic unit.

Which communication devices on the part of the diagnostic unit are to be provided for the wireless communication with the motor vehicle is a function of the selected communication technology. Here, many different wireless technologies can be used (WLAN, Bluetooth, etc.). The diagnostic unit may, for example, have a connected WLAN router. The diagnostic unit preferably even has suitable integrated communication devices, such as an integrated WLAN interface.

In this variant of the invention, the motor vehicle also has corresponding communication devices, such as a WLAN Gateway, for most of the feasible communication technologies. As an alternative, the motor vehicle can be temporarily equipped with corresponding communication devices in a manner known per se, for example, only in the shop area. In addition, the motor vehicle should be in sufficient proximity to the communication devices of the diagnostic unit.

In a particularly preferred embodiment of the first variant of the invention, the diagnostic unit has suitable devices for communicating with the motor vehicle, also directly, by way of the same radio technology by which the vehicle key also communicates with the vehicle during locking and unlocking of the vehicle. Such an embodiment has the advantage that no additional equipment, such as a WLAN Gateway, has to be provided on the motor vehicle. Instead, the already existing communication devices of the motor vehicle for the electric locking system can be used.

The transmission of the authorization data from the vehicle key to the diagnostic unit can take place, for example, by way of a communication connection between a vehicle key reading device, in which the vehicle key is placed, and the diagnostic unit. The communication connection between the vehicle key reading device and the diagnostic unit is preferably wire-bound.

The authorization data stored in the vehicle key are processed, for example, coded, as required, for transmission to the diagnostic unit. Depending on the embodiment, in the case of the diagnostic unit, as required, another processing, such as a code translation, of the transmitted data is to be provided. By way of the received authorization data, the diagnostic unit establishes its authorization to communicate with the motor vehicle with respect to the motor vehicle. For example, a so-called session key for a coded transmission can be generated on the basis of the received authorization data.

After the successful establishment of a communication connection between the motor vehicle and the diagnostic unit, according to this variant of the invention, the vehicle key must not necessarily remain in the vehicle key reading device.

According to a second preferred variant of the present invention, communication of the diagnostic unit with the motor vehicle takes place by way of the vehicle key. The diagnostic unit, therefore, communicates indirectly with the motor vehicle. In this case, the diagnostic unit does not have to have its own devices for wirelessly communicating with the motor vehicle. According to this variant of the invention, the wireless communication connection (typically constructed as a radio interface), which is provided anyhow between the vehicle key and the vehicle, for example, for the unlocking of the motor vehicle, is utilized for the communication of the diagnostic unit with the motor vehicle.

According to this second variant of the invention, for the indirect wireless communication with the motor vehicle, the diagnostic unit is connected with a vehicle key writing/reading device, in which the vehicle key is placed. The diagnostic unit only has to be suitable for the connection of such a vehicle key writing/reading device and for the indirect communication with the motor vehicle by way of a vehicle key placed in the vehicle key writing/reading device.

In the case of the communication of this variant according to the invention, the vehicle key, together with the vehicle key writing/reading device, operates, as it were, as a gateway between the motor vehicle and the diagnostic unit. Before the establishment of the communication connection between the motor vehicle and the diagnostic unit, in a manner known per se, the authorization of the vehicle key is checked by way of the authorization data stored in this vehicle key. The authorization data do not need to be transmitted to the diagnostic unit.

For a proper functioning of a method according to this second variant of the invention, the motor vehicle has to be in sufficient proximity to the vehicle key placed in the vehicle key writing/reading device.

In addition to the above-mentioned advantages, there is the additional advantage of a communication method according to the invention wherein there are no service provider costs. The communication according to the present invention is otherwise also independent of a provider, a mobile telecommunication network, and/or other public or partially public communication networks.

In many cases, the described forms of communication can be implemented by way of currently existing technical devices and require no or low expenditures for the adaptation of the existing infrastructure.

Other objects, advantages and novel features of the present invention will become apparent from the following detailed description of the invention when considered in conjunction with the accompanying drawings.

DETAILED DESCRIPTION OF THE DRAWINGS

A communication connection for the exchange of diagnosis-relevant data is to be established between a diagnostic unit and a motor vehicle.

Figure 1:
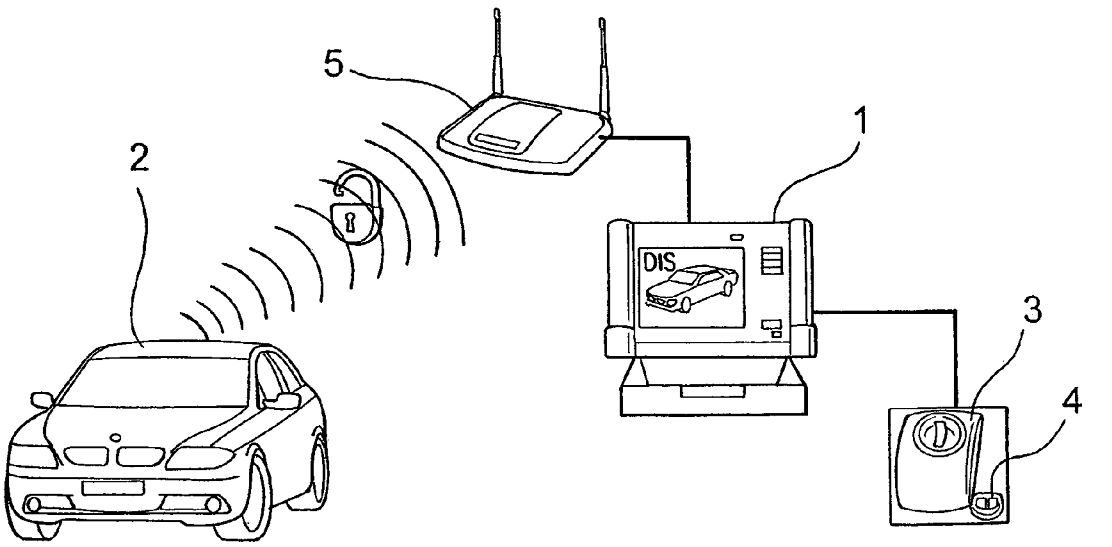
FIG. 1 is a schematic diagram of a preferred embodiment of a device for implementing a method of the first variant according to the invention.

FIG. 1 illustrates a preferred embodiment of a device for implementing the method of the first variant according to the invention. For the wireless communication with the motor vehicle 2, the diagnostic unit 1 is connected to a WLAN router 5. The motor vehicle 2 has a WLAN Gateway not specifically illustrated which is connected to a diagnostic interface of the motor vehicle 2. From a technical point of view, the WLAN router 5 and the WLAN Gateway of the motor vehicle 2 permit a WLAN communication between the diagnostic unit 1 and the motor vehicle 2. However, the establishing of communication connections by way of this WLAN interface is dependent on the checking for the authorization of the diagnostic unit 1. For this purpose, a vehicle key reading device 3 is also connected in a wire-bound manner to the diagnostic unit (tester) 1, into which vehicle key reading device 3 a vehicle key 4 can be placed. The vehicle key is assigned to the motor vehicle 2. If a vehicle key 4 is inserted, then by way of the wire-bound communication connection between the vehicle key reading device 3 and the diagnostic unit 1, authorization data are transmitted from the vehicle key 4 to the diagnostic unit 1. By means of the received authorization data, the diagnostic unit 1 proves its authorization for communicating with the motor vehicle with respect to the motor vehicle 2. The information exchange required for verifying the authorization—like the subsequent communication—already takes place by way of the WLAN interface.

Figure 2:
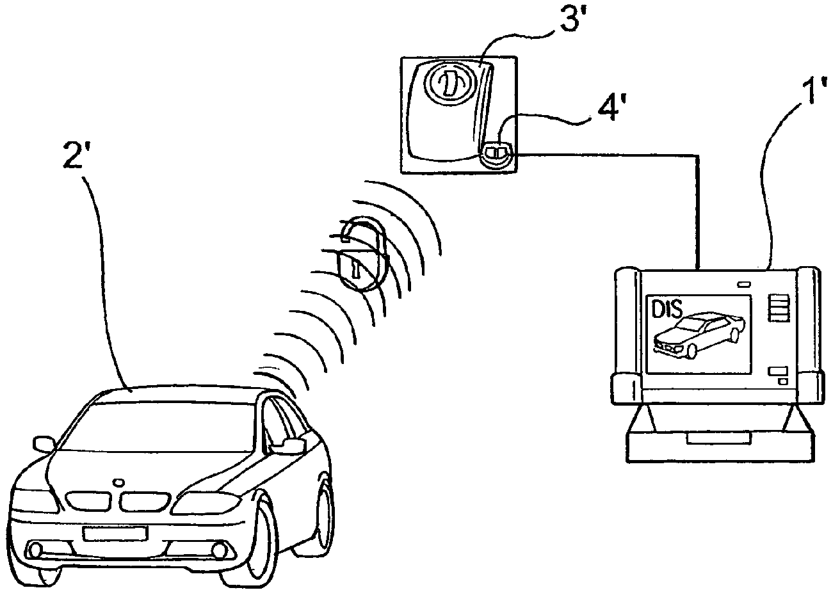
FIG. 2 is a schematic diagram of a preferred embodiment of a device for implementing a method of the second variant according to the invention.

FIG. 2 illustrates a preferred embodiment of a device for implementing a method of the second variant according to the invention. For the wireless communication with the motor vehicle 2', the diagnostic unit 1' is connected to a vehicle key writing/reading device 3'. A vehicle key 4' assigned to the motor vehicle 2' is placed in this vehicle key writing/reading device 3'. Between the vehicle key 4' and the motor vehicle 2', a radio interface is provided, for example, that used for the unlocking of the motor vehicle. In the present case, this radio interface is used for the communication of the diagnostic unit 1' with the motor vehicle 2'. For this purpose, the vehicle-side part of the radio interface is constructed and is connected with a diagnostic interface of the vehicle 2' such that an exchange of diagnosis-relevant data becomes possible by way of the radio interface. The vehicle key 4' and the vehicle key writing/reading device 3' operate jointly as a gateway between the motor vehicle 2' and the diagnostic unit 1'. Before the establishment of a communication connection between the motor vehicle 2' and the diagnostic unit 1', the authorization of the vehicle key 4' is verified by way of a challenge-response process via the authorization data stored in this vehicle key 4'. A successfully checked authorization of the vehicle key 4' indicates an authorization for the diagnostic unit 1' to establish a communication connection with the motor vehicle 2'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of communicating between a motor vehicle and a diagnostic unit wherein a wireless communication connection is established between the motor vehicle and the diagnostic unit after an authorization of the diagnostic unit has been checked, the method comprising the acts of:

connecting the diagnostic unit with a vehicle key assigned to the motor vehicle; and checking for an authorization of the diagnostic unit by way of authorization data stored in the vehicle key, wherein the diagnostic unit includes at least one device for wirelessly communicating with the motor vehicle, the authorization data are transmitted from the vehicle key to the diagnostic unit by way of a communication connection between the diagnostic unit and a vehicle key reading device in which the vehicle key is placed, a session key for coded communication between the motor vehicle and the diagnostic unit is generated on the basis of the received authorization data, and a coded communication connection is established using the session key, and once established, the coded communication connection is maintained independent of whether the vehicle key remains in communication with the vehicle key reading device.

2. A diagnostic unit for communicating wirelessly with a motor vehicle having an assigned vehicle key, comprising:

a device configured to connect the diagnostic unit with the vehicle key, the device being a vehicle key reading device in which the vehicle key is placed;

at least one device configured to wirelessly communicate between the diagnostic unit and the motor vehicle; and means for receiving authorization data from the vehicle key and generating a session key for coded communication between the motor vehicle and the diagnostic unit on the basis of the received authorization data, wherein the diagnostic unit is operatively configured for direct or indirect communication with the motor vehicle and for proving an authorization with respect to the motor vehicle by way of the session key based on the authorization data receivable from the vehicle key, and a coded communication connection is established using the session key, and once established, the coded communication connection is maintained independent of whether the vehicle key remains in communication with the vehicle key reading device.

3. The diagnostic unit according to claim 2, further comprising:

a device configured to communicate with the motor vehicle by way of a same radio technology by which the vehicle key communicates with the motor vehicle during locking and unlocking of the motor vehicle.

* * * * *